United States Patent
Gebreselassie et al.

(10) Patent No.: US 6,695,374 B1
(45) Date of Patent: Feb. 24, 2004

(54) VEHICLE COCKPIT ASSEMBLIES HAVING INTEGRATED DASH INSULATORS, INSTRUMENT PANELS AND FLOOR COVERINGS, AND METHODS OF INSTALLING SAME WITHIN VEHICLES

(75) Inventors: Girma Gebreselassie, Southfield, MI (US); Matt Starling, Ypsilanti, MI (US); Anthony J. Messina, Royal Oak, MI (US); Surendra Khambete, West Bloomfield, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/256,695

(22) Filed: Sep. 27, 2002

(51) Int. Cl.[7] ............................................. B62D 25/14
(52) U.S. Cl. ...................... 296/24.1; 296/70; 296/39.3; 296/193.02; 180/90
(58) Field of Search .................... 296/70, 24.1, 193.02, 296/193.04, 97.23, 89.3, 72, 73, 74, 192; 180/90

(56) References Cited

U.S. PATENT DOCUMENTS

| | | | |
|---|---|---|---|
| 3,789,945 A | | 2/1974 | Hansen |
| 4,582,156 A | | 4/1986 | Kochy et al. |
| 4,597,461 A | | 7/1986 | Kochy et al. |
| 4,655,496 A | * | 4/1987 | Gahlau et al. ............. 296/39.3 |
| 5,005,898 A | * | 4/1991 | Benedetto et al. .......... 296/194 |
| 5,064,714 A | | 11/1991 | Yamaguchi et al. |
| 5,082,078 A | * | 1/1992 | Umeda et al. ................ 296/70 |
| 5,120,106 A | * | 6/1992 | Sakurai et al. .............. 296/194 |
| 5,266,374 A | * | 11/1993 | Ogata ......................... 296/39.3 |
| 5,358,300 A | * | 10/1994 | Gray ........................... 296/192 |
| 5,364,159 A | | 11/1994 | Kelman et al. |
| 5,439,725 A | * | 8/1995 | Roberts .................... 296/97.23 |
| 5,556,153 A | | 9/1996 | Kelman et al. |
| 5,573,294 A | * | 11/1996 | Mack ....................... 296/97.23 |
| 5,580,122 A | * | 12/1996 | Muehlhausen .............. 296/194 |
| 5,817,408 A | * | 10/1998 | Orimo et al. ............... 296/39.3 |
| 5,922,265 A | | 7/1999 | Parekh |
| 6,102,465 A | * | 8/2000 | Nemoto et al. ............ 296/39.3 |
| 6,371,551 B1 | * | 4/2002 | Hedderly .................... 296/192 |
| 6,601,909 B2 | * | 8/2003 | Obara et al. ................ 296/191 |
| 2002/0025421 A1 | | 2/2002 | Sugawara et al. |

FOREIGN PATENT DOCUMENTS

EP          0 909 680          4/1999

\* cited by examiner

*Primary Examiner*—Stephen T. Gordon
*Assistant Examiner*—Greg Blankenship
(74) *Attorney, Agent, or Firm*—Myers Bigel Sibley & Sajovec

(57) ABSTRACT

Vehicle cockpit assemblies and methods of installing same within vehicles are provided. A vehicle cockpit assembly includes a dash insulator that is configured to be attached to a vehicle firewall, an instrument panel attached to the dash insulator, and a floor covering also attached to the dash insulator. A plurality of apertures are formed through the dash insulator, each of which is configured to overlie a respective opening in a vehicle firewall when attached thereto. Each aperture is configured to sealably receive an item extending therethrough such that substantially no gaps exist between the item and the substrate. Polyurethane may be added to one or more selected portions of the dash insulator to reflect and/or absorb sound.

22 Claims, 5 Drawing Sheets

VEHICLE COCKPIT ASSEMBLIES HAVING INTEGRATED DASH INSULATORS, INSTRUMENT PANELS AND FLOOR COVERINGS, AND METHODS OF INSTALLING SAME WITHIN VEHICLES

FIELD OF THE INVENTION

The present invention relates generally to vehicles and, more particularly, to trim components utilized within vehicles.

BACKGROUND OF THE INVENTION

It is generally considered desirable to reduce the level of noise within a vehicle passenger compartment. External noises, such as road noise, engine noise, vibrations, etc., as well as noises emanating from within passenger compartments, may be attenuated through the use of various acoustical materials. Accordingly, sound attenuating materials for vehicles, such as automobiles, are conventionally used in the dashboard, in conjunction with carpeting for floor panels, in the wheel wells, in the trunk compartment, under the hood, and as part of the headliner.

The attenuation of external noise is conventionally referred to as sound transmission loss (STL). The attenuation of internal noise is conventionally referred to as sound absorption. The acoustic impedance of a material is defined as material density times acoustic velocity, and is expressed in units of Rayls (Newton-seconds/meter$^3$). Acoustic impedance defines how easy it is for air to move through a material. Thus, for fibrous materials, acoustic impedance depends upon the density of the fibrous material and fiber diameter. Generally, the heavier the blanket and the finer the fibers, the higher the acoustic impedance. Moreover, thicker layers typically have more acoustic impedance than thin layers. The ability of a material to attenuate noise is conventionally defined by the material's STL, acoustic impedance, and absorption characteristics.

Carpeting used to cover the floor areas of vehicles, such as automobiles, is conventionally molded into a non-planar three dimensional contoured configuration which conforms to the contours of the vehicle floor so as to fit properly. In order to make the carpeting moldable and shape-sustaining, it is conventionally provided with a backing of thermoplastic polymer composition. The thermoplastic polymer backing also serves as a barrier to improve the sound deadening properties of the carpet assembly.

Dash insulators are often mounted to a vehicle firewall which separates the passenger compartment from an engine compartment. Dash insulators are designed to reduce the transmission of noise and heat from the engine compartment into the passenger compartment. Conventional dash insulators consist of an acoustical absorber such as an open-cell polyurethane foam or a resinated fiber pad which faces the fire wall, and a barrier sheet such as a heavily filled thermoplastic material. Dash insulator barriers are conventionally produced in a compounding process followed by an extrusion or calendaring process or by an injection molding process to achieve a barrier sheet of desired thickness and width.

FIG. 1 illustrates a conventional dash insulator 10 for reducing noise and heat transmitted from an engine compartment of a motor vehicle 12 into a passenger compartment. The dash insulator 10 is adapted to be mounted inside the passenger compartment of the vehicle against substantially the width of a fire wall 14 that separates the engine compartment from the passenger compartment.

Vehicle instrument panels are generally located behind the steering wheel of a vehicle and include a number of gauges or other displays for providing a driver with information about vehicle conditions. In addition, air vents for distributing cooled and heated air throughout a passenger compartment are often mounted within an instrument panel. Instrument panels are conventionally mounted onto a vehicle firewall with the dash insulator disposed therebetween. FIG. 2 illustrates a conventional instrument panel 20. The illustrated instrument panel 20 includes an instrument cluster area 22, air vents 24, central console area 26 and glove box 28.

FIG. 3 illustrates a conventional automotive carpet assembly 30. The illustrated carpet assembly 30 has a nonplanar three dimensional molded configuration adapted to fit in the front seat compartment of an automobile and includes a raised medial portion 31 adapted to conform to the transmission hump, generally vertically extending side portions 32 adapted to fit beneath the door opening, and a front portion 33 adapted to fit along the inclined floorboard and portions of a vehicle firewall. Various openings or cut-outs are provided, as indicated at 34, to receive air conditioning equipment, the steering column, pedals and the like.

During vehicle manufacturing, dash insulators, instrument panels and floor coverings are typically installed separately. In addition, the installation of dash insulators, instrument panels and floor coverings can be complex and labor intensive. As such, vehicle manufacturers are continuously looking for ways to reduce costs and complexity associated with vehicle manufacturing.

U.S. Pat. No. 4,597,461 to Kochy et al. describes a pre-assembled module for the cockpit zone of a motor vehicle, which is adapted to be mounted as one single unit inside the vehicle body and which incorporates essentially the following components: an instrument board including all instruments and accessories commonly contained therein, fuse box and electric wiring, heater with controls and air distribution system; furthermore a steering system including steering wheel, steering column enclosure and steering support means; also pedals for clutch and brake, including mounting brackets. The vehicle body includes a fire wall and fire wall support member to which the aforementioned components and accessories are connected when in the installed position. The fire wall and fire wall support member are separated from the body shell and serve as an assembly base for the unit. In the installed position, the fire wall and fire wall support member are sealingly connected with the respective adjacent body panels.

SUMMARY OF THE INVENTION

In view of the above discussion, vehicle cockpit assemblies and methods of installing same within vehicles are provided. According to embodiments of the present invention, a vehicle cockpit assembly includes a dash insulator that is configured to be attached in face-to-face contacting relationship to a vehicle firewall, an instrument panel attached to the dash insulator, and a floor covering (e.g. molded carpet assembly) also attached to the dash insulator. The dash insulator includes a substrate having opposite first and second surfaces and opposite first and second edge portions. A plurality of apertures are formed through the substrate, each of which is configured to overlie a respective opening in a vehicle firewall when attached thereto. Each aperture is configured to sealably receive an item (e.g., air conditioning equipment, steering column, pedals and the like) extending therethrough between the engine and passenger compartments such that substantially no gaps exist between the item and the substrate. Polyurethane (or other sound attenuation material) may be added to one or more selected portions of the substrate first and/or second surfaces. The polyurethane may be configured to reflect and/or absorb sound directed to the dash insulator.

The instrument panel is attached to the substrate first edge portion. Preferably, the instrument panel and dash insulator are movably attached to each other to facilitate installation thereof within a vehicle. The floor covering is attached to the dash insulator substrate second edge portion. Preferably, the floor covering and dash insulator are movably attached to each other to facilitate installation thereof within a vehicle.

According to embodiments of the present invention, a vehicle cockpit assembly includes a dash insulator having two, separate portions: an upper substrate having opposite first and second surfaces and opposite first and second edge portions, and a lower substrate having opposite third and fourth surfaces and opposite third and fourth edge portions. An instrument panel is attached to the upper substrate first edge portion, and a floor covering is attached to the lower substrate fourth edge portion.

According to embodiments of the present invention, the instrument panel is movably attached to the upper substrate first edge portion such that movement of the instrument panel relative to the upper substrate facilitates installation of the cockpit assembly within a vehicle passenger compartment during vehicle assembly. Similarly, the floor covering may be movably attached to the lower substrate second edge portion such that movement of the floor covering relative to the lower substrate facilitates installation of the cockpit assembly within a vehicle passenger compartment during vehicle assembly. The upper and lower dash insulator substrates are configured to be joined together along the respective second and third edge portions. Upon installation of the upper and lower substrates within a vehicle, the respective second and third edge portions are joined together.

According to embodiments of the present invention, operations for installing a vehicle cockpit assembly within a passenger compartment of a vehicle include providing a dash insulator that is configured to be attached to a vehicle firewall, attaching an instrument panel to an upper portion of the dash insulator, attaching a floor covering to a lower portion of the dash insulator, ascertaining acoustic properties of the vehicle to identify portions of the dash insulator requiring sound reflection and/or absorption, applying sound reflection and/or absorption material to identified portions of the dash insulator, and installing the cockpit assembly within a vehicle.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
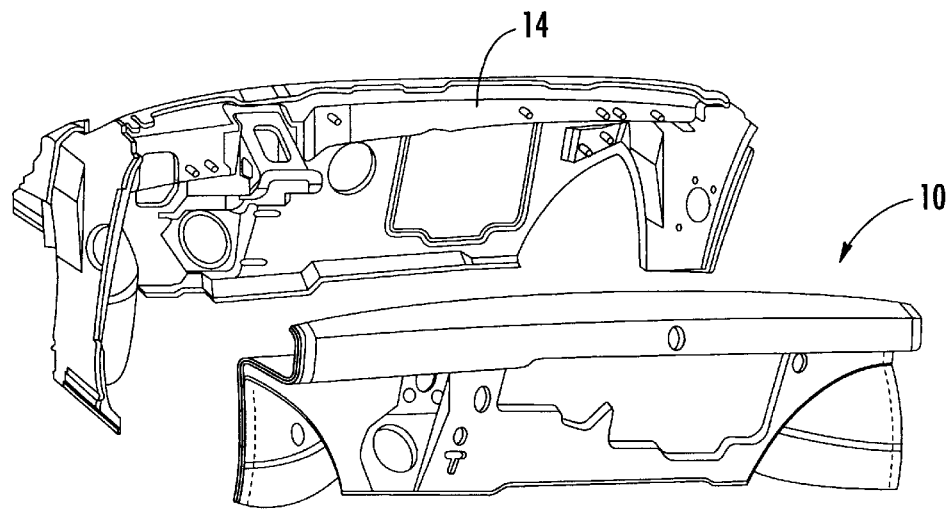
FIG. 1 is a partial perspective view of a vehicle illustrating a conventional dash insulator for reducing noise and heat transmitted from an engine compartment into a passenger compartment via a firewall.
Figure 2:
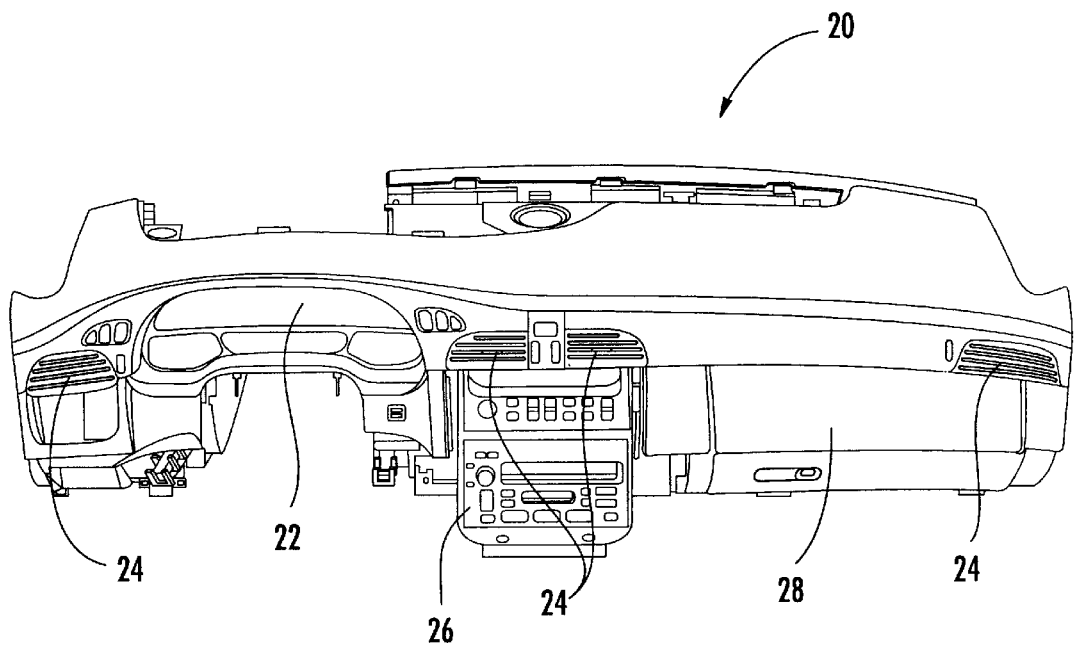
FIG. 2 is a perspective view of a conventional instrument panel for a vehicle.
Figure 3:
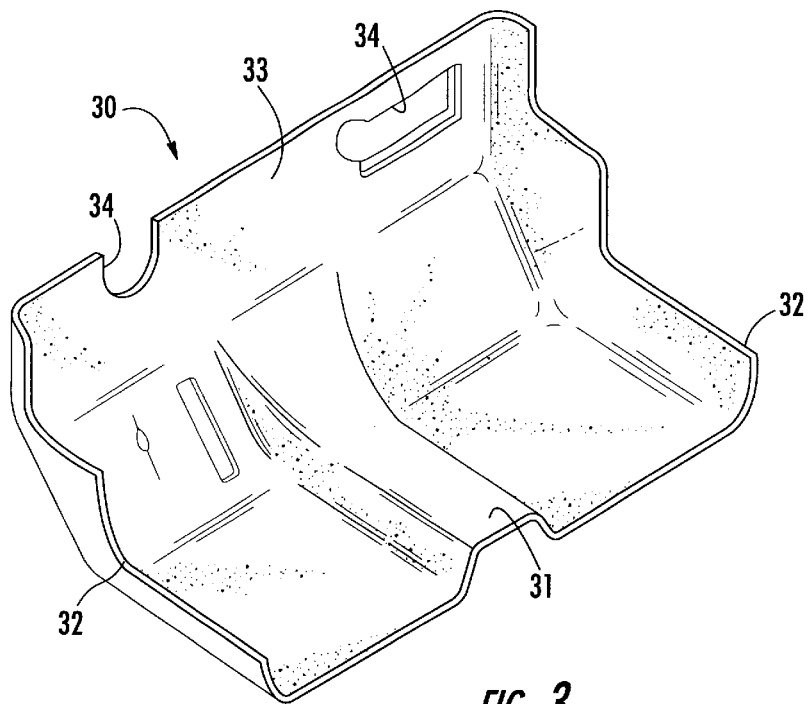
FIG. 3 is a perspective view of a conventional carpet assembly for a vehicle.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like when used herein are for the purpose of explanation only.

Figure 4:
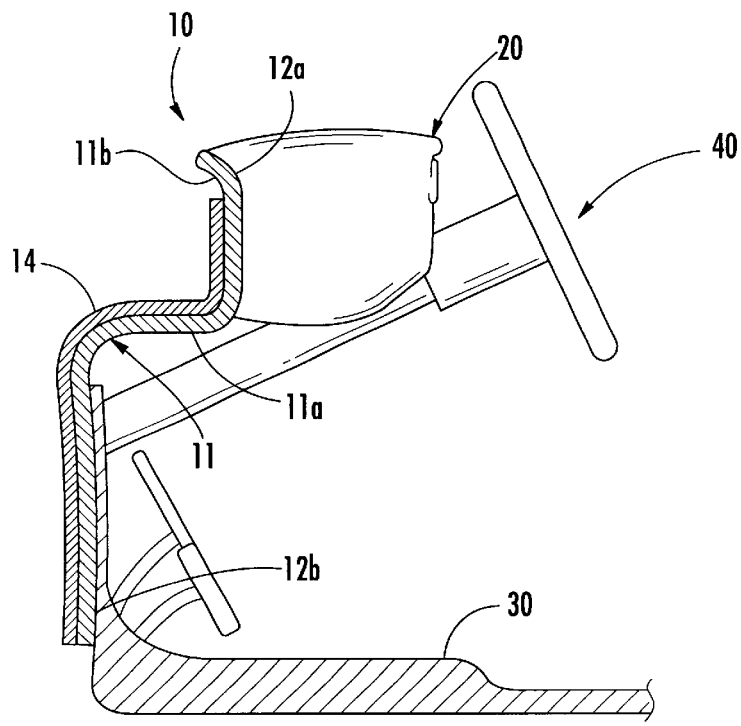
FIG. 4 is a side elevation view of a vehicle cockpit assembly, according to embodiments of the present invention, taken along lines 4—4 of FIG. 5 and illustrating an instrument panel and carpet assembly attached to a dash insulator.
Figure 5:
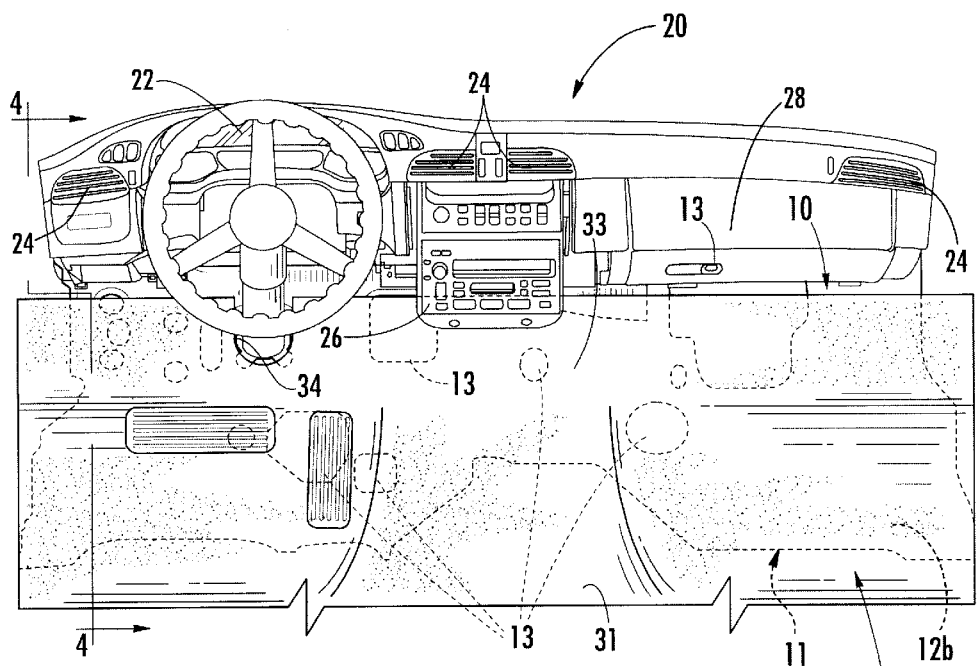
FIG. 5 is a front plan view of a vehicle cockpit assembly according to embodiments of the present invention.

Embodiments of the present invention provide vehicle cockpit assemblies and methods of installing same within vehicles that can reduce manufacturing costs and complexity. Referring to FIGS. 4–5, a vehicle cockpit assembly 40 according to embodiments of the present invention is illustrated. The vehicle cockpit assembly 40 includes a dash insulator 10 that is configured to be attached in face-to-face contacting relationship to a vehicle firewall, an instrument panel 20 attached to the hash insulator 10, and a floor covering (e.g., molded carpet assembly) 30 also attached to the dash insulator 10. The dash insulator 10 includes a substrate 11 having a non-planar three dimensional molded configuration adapted to fit the firewall of a vehicle. It is to be understood that the particular three dimensional configuration illustrated is merely for purposes of illustration. Dashboard insulators according to embodiments of the present invention may have various configurations and shapes depending on the firewall configuration of a vehicle.

The substrate 11 may be formed from any type of material including, but not limited to foam (e.g., polyurethane foam, thermoplastic foam, etc.), barrier material, and other thermoformable fibrous materials including those derived from natural and synthetic fibers. Barrier material is a relatively dense material, normally impermeable to air and thermoformable. Barrier material can be formed from virtually any plastic or rubber material which contains a high-mass filler material. An exemplary barrier material includes ethylene-vinylacetate (EVA) copolymer, polyethylene, or polyvinylchloride (PVC), and a high-mass filler material, such as glass, calcium carbonate or barium sulfate, added to increase the mass. Other suitable materials for the substrate 11 include thermoformable thermoplastic materials such as polystyrene, polyphenyl sulfide and polycarbonate, fiber-reinforced thermoplastics and fiber-reinforced thermosets such as epoxies, phenolics and the like, as well as various types of thermosetting materials.

The illustrated substrate 11 includes opposite first and second surfaces 11a, 11b and opposite first and second edge portions 12a, 12b. A plurality of apertures 13 (FIG. 5) are formed through the substrate 11, each of which is configured to overlie a respective opening in a vehicle firewall when attached thereto. Each aperture 13 is configured to sealably receive an item (e.g., air conditioning equipment, steering column, pedals and the like) extending therethrough between the engine and passenger compartments such that substantially no gaps exist between the item and the substrate.

Sound attenuation material (e.g., polyurethane) may be added to one or more selected portions of the substrate first and/or second surfaces 11a, 11b. The sound attenuation material may be configured to reflect and/or absorb sound directed to the dash insulator 10. In the illustrated embodiment, a polyurethane barrier layer 14 is applied to selected portions of the substrate second surface 11b. The polyurethane barrier layer 14 may also be applied to the entire second surface 11b of the substrate 11. The polyurethane barrier layer 14 is non-porous and is configured to attenuate sound passing through a vehicle firewall and through the dash insulator 10.

According to embodiments of the present invention, substrate 11 and layer 14 may be the same material (e.g., impermeable barrier material). As an example, substrate 11 may be a barrier material with additional barrier material (e.g., sprayable polyurethane) 14 added to one or more selected portions of the substrate 11. Furthermore, substrate 11 may have variable thickness.

According to other embodiments of the present invention, a porous material (e.g., a foam or fiber decoupler layer) may be added as a layer to one or more portions of the substrate 11. A fibrous decoupler layer may include natural and/or manmade fibers.

According to embodiments of the present invention, a non-porous polyurethane barrier layer 14 may have a specific gravity of between about 1.0 and about 2.0, and may have a thickness of between about 1 millimeter (mm) to about 8 mm. The polyurethane barrier layer 14 may comprise an isocyanate, a polyol and various additives such as crosslinking agents, catalysts, the selection of which will be within the skill of one in the art. For example, the isocyanate component of the polyurethane includes one or more compounds selected from the group consisting of diphenylmethane-4, 4'-diisocyanate, diphenyldimethylmethane-4, 4'-diisocyanate, phenylene-1, 4-diisocyanate, 2,2',6,6'-tetramethyldiphenylmethane -4,4'-diisocyanate, diphenyl-4, 4' ndiisocyanate, diphenylether-4, 4'-diisocyanate or its alkyl-, alkoxy- or halogen-substituted derivatives, toluylene-2, 4- and -2,6-diisocyanates or their commercially available mixture, 2,4-diisocypropylphenylene-1, 3-diisocyanate, m-xylylenediisocyanate, and p-xylylenediisocyanate.

Further, in the practice of the present invention, any desired types of polyester polyols and polyether polyols may be used as a polyol component of the polyurethane prepolymer solution. Examples of the crosslinking agent usable in the present invention include trifunctional or more functional polyisocyanate or hydroxyl compounds, for example, one or more compounds selected from the group consisting of ethylene glycol, propylene glycol, butane-1, 4-diol, hexane-2, 5-diol, 2,2-dimethylpropane-1, 3-diol, hexane-1, 6-diol, 2-methylhexane-1,6-diol, 2,2-dimethylhexane-1,3-diol, p-bishydroxymethyl cyclohexane, 3-methylpentane-1, 4-diol, 2,2-diethylpropane-1, 3-diol and the like. As the catalyst, tertiary amines, organic tin compounds, organic lead compounds and the like may be used. As the solvent capable of dissolving polyols and isocyanates, methyl ethyl ketone, ethyl acetate, toluene, xylene, dimethylformamide, methyl isobutyl ketone, butyl acetate, acetone or the like may be used alone or in combination.

According to embodiments of the present invention, the polyurethane barrier layer 14 may include a filler, such as calcium carbonate, calcium hydroxide, aluminum trihydrate, talc, bentonite, barytes, silica, clay and mica.

An exemplary polyurethane barrier material that may be used in accordance with embodiments of the present invention is Bayer Elastomer (Bayer AG, Pittsburgh, Pa.). Another exemplary polyurethane barrier material that may be used in accordance with embodiments of the present invention is Huntsman Rimline SH 80309 (Huntsman Corporation, Salt Lake City, Utah).

Figure 6:
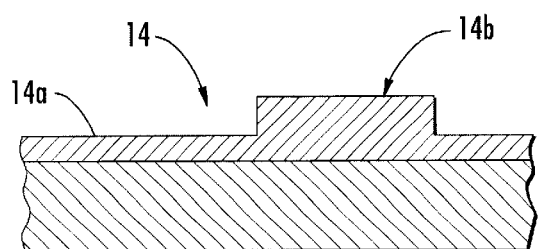
FIG. 6 is an enlarged, partial cross-sectional view of a dash insulator having polyurethane of different thicknesses applied thereto, according to embodiments of the present invention.

As illustrated in FIG. 6, the polyurethane barrier layer 14 may have a first thickness in a first location 14a and a second thickness greater than the first thickness in a second location 14b.

According to embodiments of the present invention, polyurethane applied to a dash insulator 10 according to embodiments of the present invention may be a breathable polyurethane such that sound absorption characteristics of the dashboard insulator 10 are enhanced. Moreover, there may be a combination of breathable polyurethane and non-porous polyurethane such that both sound absorption and sound attenuation characteristics of the dashboard insulator 10 are enhanced.

According to the illustrated embodiment of FIGS. 4–5, the instrument panel 20 is attached to the substrate first edge portion 12a. Attachment may be via polyurethane or other curable adhesive material applied to the dash insulator 10, instrument panel 20, or both during molding of these components. Preferably, the instrument panel 20 and dash insulator 10 are movably attached to each other. A hinge or other device known to those skilled in the art may be utilized. Polyurethane or other adhesive material may be applied so as to serve the function of a hinge, thereby permitting movement of the instrument panel 20 relative to the dash insulator 10. Movement of the instrument panel 20 relative to the dash insulator 10 can facilitate installation thereof within a vehicle.

According to embodiments of the present invention illustrated in FIGS. 4–5, a floor covering (e.g., a carpet assembly) 30 is attached to the dash insulator substrate second edge portion 12b. It is to be understood that the particular carpet assembly configuration illustrated is merely for purposes of illustration, and the actual configuration may vary quite significantly from that shown depending on the automobile within which it is attached.

Attachment of the floor covering 30 to the dash insulator 10 may be via polyurethane or other curable adhesive material applied to the dash insulator 10, floor covering 30, or both during molding of these components. Preferably, the floor covering 30 and dash insulator 10 are movably attached to each other. A hinge or other device known to those skilled in the art may be utilized. Polyurethane or other adhesive material may be applied so as to serve the function of a hinge, thereby permitting movement of the floor covering 30 relative to the dash insulator 10. Movement of the floor covering 30 relative to the dash insulator 10 can facilitate installation thereof within a vehicle.

Figure 7:
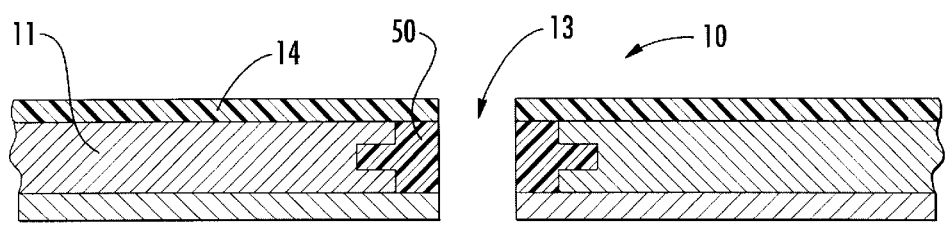
FIG. 7 is an enlarged, partial cross-sectional view of a dash insulator having an aperture that is configured to sealably receive an item extending therethrough such that no gaps exist between the item and the dash insulator.

Referring to FIG. 7, an aperture 13 in the illustrated dash insulator 10 is illustrated in more detail. The aperture 13 includes a secondary article (e.g., a plastic pass-through) 50 that is molded-in with the dash insulator substrate 11. The secondary article 50 is sized and configured to sealably receive an item extending therethrough such that substantially no gaps exist between the item and the substrate 11. As such, sound cannot "leak through" the aperture 13 as may often be the case in conventional dash insulators.

Figure 8:
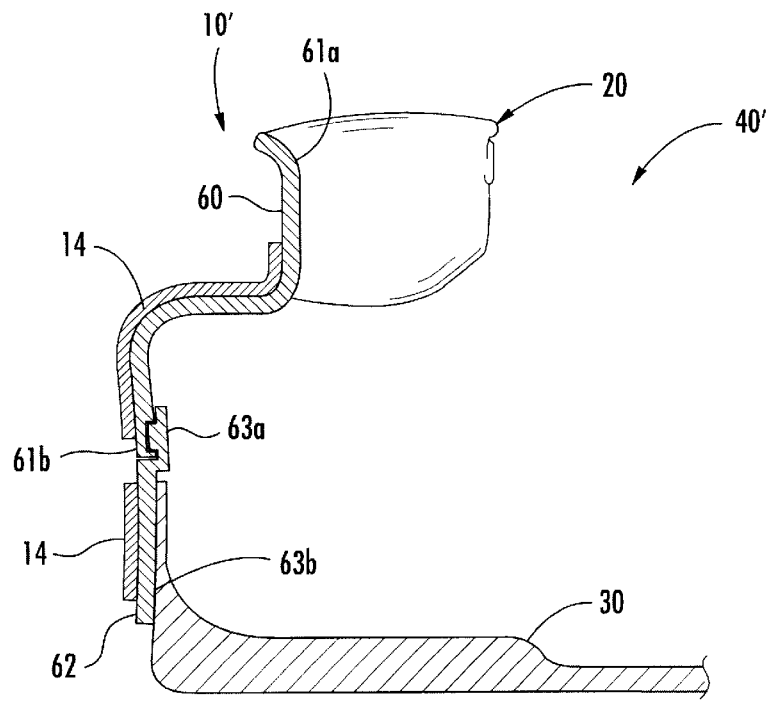
FIG. 8 is a side elevation view of a vehicle cockpit assembly, according to embodiments of the present invention, and illustrating an instrument panel and carpet assembly attached to respective upper and lower separate portions of a dash insulator.

Referring to FIG. 8, a vehicle cockpit assembly 40' configured to be installed within a passenger compartment of a vehicle, according to other embodiments of the present invention is illustrated. The dash insulator 10 is comprised of two portions: an upper substrate 60 having opposite first and second surfaces 60a, 60b and opposite first and second edge portions 61a, 61b, and a lower substrate 62 having opposite third and fourth surfaces 62a, 62b and opposite third and fourth edge portions 63a, 63b.

An instrument panel 20 is attached to the upper substrate first edge portion 61a, and a floor covering 30 is attached to the lower substrate fourth edge portion 63b. According to embodiments of the present invention, the instrument panel 20 is movably attached to the upper substrate first edge portion 61a (e.g., via a hinge, or otherwise as described above with respect to the embodiments of FIGS. 4–5), such that movement of the instrument panel 20 relative to the upper substrate 60 facilitates installation of the cockpit assembly 40' within a vehicle passenger compartment during vehicle assembly. Similarly, the floor covering 30 may be movably attached to the lower substrate second edge portion 63b (e.g., via a hinge, or otherwise as described above with respect to the embodiments of FIGS. 4–5), such that movement of the floor covering 30 relative to the lower substrate 62 facilitates installation of the cockpit assembly 40' within a vehicle passenger compartment during vehicle assembly.

Figure 9:
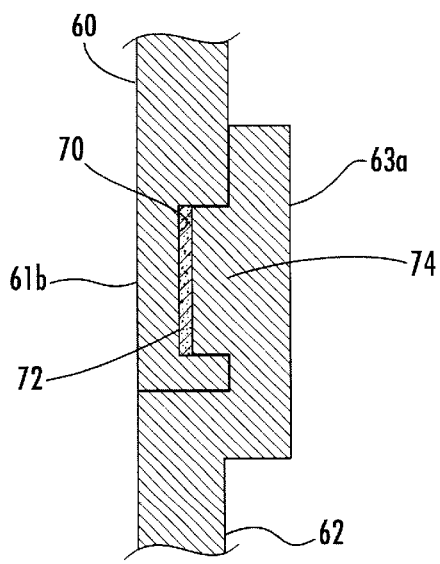
FIG. 9 is an enlarged, partial side-elevation view of the vehicle cockpit assembly of FIG. 8 illustrating the attachment of the upper a lower dash insulator portions, according to an embodiment of the present invention.

The upper and lower substrates 60, 62 are configured to be joined together along the respective second and third edge portions 61b, 63a. Upon installation of the upper and lower substrates 60, 62 within a vehicle, the respective second and third edge portions 61b, 63a are adhesively joined together. According to embodiments of the present invention illustrated in FIG. 9, the second edge portion 61b is configured with a groove 70. A layer of adhesive 72 is disposed within the groove 70. The third edge portion 63a includes a raised portion 74 that is configured to matingly engage with the groove 70. The adhesive layer 72 maintains the upper and lower substrates in joined relationship.

According to embodiments of the present invention, the groove 70 and raised portion 74 may be reversed. That is, the third edge portion 63a may include a groove and the second edge portion 61b may contain a raised portion that is configured to matingly engage with the groove.

Various types of adhesives known to those skilled in the art may be utilized. Various other ways of joining the upper and lower substrates together may be utilized, as would be known to those skilled in the art. Embodiments of the present invention are not limited to the embodiments illustrated herein.

Figure 10:
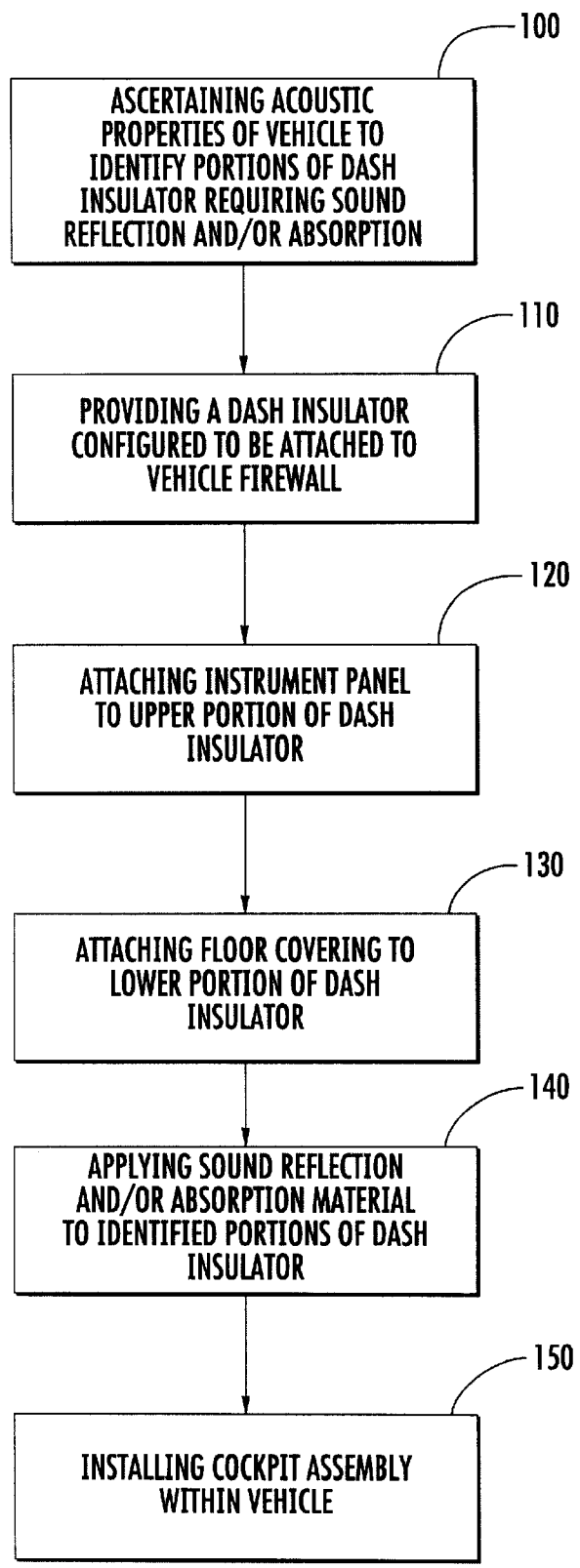
FIG. 10 is a flowchart of operations for installing vehicle cockpit assemblies within passenger compartments of vehicles, according to embodiments of the present invention.

Referring now to FIG. 10, operations for installing a vehicle cockpit assembly within a passenger compartment of a vehicle, according to embodiments of the present invention, include ascertaining acoustic properties of the vehicle to identify portions of the dash insulator requiring sound reflection and/or absorption (Block 100), providing a dash insulator that is configured to be attached to the vehicle firewall (Block 110), attaching an instrument panel to an upper portion of the dash insulator (Block 120), attaching a floor covering to a lower portion of the dash insulator (Block 130), applying sound reflection and/or absorption material to identified portions of the dash insulator requiring sound reflection and/or absorption (Block 140), and installing the cockpit assembly within a vehicle (Block 150).

An instrument panel and floor covering may be movably attached to a dash insulator as described above to facilitate installing the vehicle cockpit assembly within a vehicle. Acoustic properties of a vehicle may be ascertained (Block 100) by identifying areas of a firewall through which sound within a predetermined frequency range passes at an intensity level that exceeds a threshold intensity level. Identifying areas of a firewall through which sound within a predetermined frequency range passes at an intensity level that exceeds a threshold intensity level may include generating a sound intensity map of the vehicle and/or firewall. Sound intensity maps are well understood by those skilled in the art and need not be described further herein.

Applying sound reflection and/or absorption material to identified portions of the dash insulator (Block 140) may include spraying polyurethane (or other materials) to one or more portions of the dash insulator. In addition, polyurethane may be applied to one or more portions of a dash insulator with varying thickness. Other techniques for applying polyurethane may be utilized. Polyurethane is applied to a dash insulator in areas identified as requiring enhanced sound attenuation characteristics. This may encompass applying additional polyurethane directly onto an existing polyurethane barrier layer and/or into one or more recessed portions formed within the substrate. Areas of the dash insulator in which apertures are to be formed therethrough are preferably avoided during the application of polyurethane.

As is known to those skilled in the art, a dash insulator may be formed from multiple layers of material, such as polyurethane. Additional layers may be added in areas requiring enhanced sound attenuation characteristics.

A vehicle cockpit assembly according to embodiments of the present invention may include a dash insulator having upper and lower portions, as described above. Accordingly, installing the cockpit assembly within a vehicle (Block 150)

may include separately installing the upper and lower dash insulator portions (with respective instrument panel and floor covering attached thereto) and then securing the upper and lower dash insulator portions together within the vehicle.

According to embodiments of the present invention, various ones of the operations illustrated in FIG. 10 may be performed out of the illustrated order. For example, polyurethane may be added to various portions of a dash insulator prior to dash insulator forming (i.e., molding) operations. As another example, a substrate may be formed prior to the application of any polyurethane. As another example, polyurethane may be applied within a mold and additional polyurethane added in selected locations. A substrate may then be attached to the polyurethane and the composite article formed via the mold into a desired shape.

Furthermore, operations represented by various blocks may be performed substantially simultaneously. For example, additional polyurethane can be added by adjusting processing speeds and/or by adjusting dispensing pressure, as would be understood by those skilled in the art.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A vehicle cockpit assembly configured to be installed within a passenger compartment of a vehicle, wherein the passenger compartment is separated from an engine compartment by a firewall, wherein the firewall includes one or more openings formed therethrough, wherein the cockpit assembly comprises:
   a dash insulator that is configured to be attached in face-to-face contacting relationship to the vehicle firewall, comprising:
      a substrate of thermoformable material having opposite first and second surfaces and opposite first and second edge portions; and
      one or more apertures formed through the substrate, each of which overlies a respective one of the firewall openings, and wherein each aperture is configured to sealably receive an item extending therethrough between the engine and passenger compartments such that no gaps exist between the item and the substrate; and
   an instrument panel adhesively attached to the substrate first edge portions wherein the instrument panel and dash insulator can move relative to each other to facilitate installation of the cockpit assembly within the vehicle passenger compartment during vehicle assembly.

2. The vehicle cockpit assembly of claim 1, further comprising a floor covering attached to the substrate second edge portion.

3. The vehicle cockpit assembly of claim 2, wherein the floor covering is movably attached to the substrate second edge portion, and wherein movement of the floor covering relative to the dash insulator facilitates installation of the cockpit assembly within the vehicle passenger compartment during vehicle assembly.

4. The vehicle cockpit assembly of claim 1, wherein the floor covering is movably attached to the substrate.

5. The vehicle cockpit assembly of claim 1, further comprising polyurethane applied to one or more portions of the substrate first and/or second surface, wherein the polyurethane is configured to reflect and/or absorb sound directed to the dash insulator.

6. The vehicle cockpit assembly of claim 5, wherein the polyurethane comprises a layer of polyurethane having a first thickness in a first portion and a second thickness greater than the first thickness in a second portion.

7. A vehicle cockpit assembly configured to be installed within a passenger compartment of a vehicle, wherein the passenger compartment is separated from an engine compartment by a firewall, wherein the firewall includes one or more openings formed therethrough, wherein the cockpit assembly comprises, wherein the passenger compartment comprises a floor:
   a dash insulator that is configured to be attached in face-to-face contacting relationship to the vehicle firewall, comprising:
      a substrate of thermoformable material having opposite first and second surfaces and opposite first and second edge portions; and
      one or more apertures formed through the substrate, each of which overlies a respective one of the firewall openings, and wherein each aperture is configured to sealably receive an item extending therethrough between the engine and passenger compartments such that no gaps exist between the item and the substrate;
   polyurethane applied to one or more portions of the substrate first and/or second surfaces, wherein the polyurethane is configured to reflect and/or absorb sound directed to the dash insulator;
   an instrument panel adhesively attached to the substrate first edge portion, wherein the instrument panel and dash insulator can move relative to each other to facilitate installation of the cockpit assembly within the vehicle passenger compartment during vehicle assembly; and
   a floor covering adhesively attached to the substrate second edge portion, wherein the floor covering and dash insulator can move relative to each other to facilitate installation of the cockpit assembly within the vehicle passenger compartment during vehicle assembly.

8. The vehicle cockpit assembly of claim 7, wherein the polyurethane comprises a layer of polyurethane having a first thickness in a first portion and a second thickness greater than the first thickness in a second portion.

9. A vehicle cockpit assembly configured to be installed within a passenger compartment of a vehicle, wherein the passenger compartment is separated from an engine compartment by a firewall, wherein the firewall includes one or more openings formed therethrough, wherein the cockpit assembly comprises, wherein the passenger compartment comprises a floor:
   a dash insulator that is configured to be attached to the vehicle firewall, comprising:

an upper substrate of thermoformable material having opposite first and second surfaces and opposite first and second edge portions; and a lower substrate of thermoformable material having opposite third and fourth surfaces and opposite third and fourth edge portions;

wherein the upper and lower substrates are configured to be joined together along the respective second and third edge portions;

an instrument panel adhesively attached to the upper substrate first edge portion, wherein the instrument panel and dash insulator can move relative to each other to facilitate installation of the cockpit assembly within the vehicle passenger compartment during vehicle assembly; and a floor covering adhesively attached to the lower substrate fourth edge portions wherein the floor covering and dash insulator can move relative to each other to facilitate installation of the cockpit assembly within the vehicle passenger compartment during vehicle assembly.

10. The vehicle cockpit assembly of claim 9, further comprising polyurethane applied to one or more portions of the dash insulator, wherein the polyurethane is configured to reflect and/or absorb sound directed to the dash insulator.

11. The vehicle cockpit assembly of claim 9, wherein the polyurethane comprises a layer of polyurethane having a first thickness in a first portion and a second thickness greater than the first thickness in a second portion.

12. A vehicle, comprising:

an engine compartment;

a passenger compartment;

a firewall separating the engine compartment and passenger compartment, wherein the firewall includes one or more openings formed therethrough; and a vehicle cockpit assembly installed within the passenger compartment, wherein the cockpit assembly comprises:

a dash insulator that is configured to be attached in face-to-face contacting relationship to the vehicle firewall, comprising:

a substrate of thermoformable material having opposite first and second surfaces and opposite first and second edge portions; and one or more apertures formed through the substrate, each of which overlies a respective one of the firewall openings, and wherein each aperture is configured to sealably receive an item extending therethrough between the engine and passenger compartments such that no gaps exist between the item and the substrate; and an instrument panel adhesively attached to the substrate first edge portion, wherein the instrument panel and dash insulator can move relative to each other to facilitate installation of the cockpit assembly within the vehicle passenger compartment during vehicle assembly.

13. The vehicle of claim 12, further comprising a floor covering attached to the substrate second edge portion.

14. The vehicle of claim 13, wherein the floor covering is movably attached to the substrate second edge portion, and wherein movement of the floor covering relative to the dash insulator facilitates installation of the cockpit assembly within the vehicle passenger compartment during vehicle assembly.

15. The vehicle of claim 13, wherein the floor covering is movably attached to the substrate.

16. The vehicle of claim 12, further comprising polyurethane applied to one or more portions of the substrate first and/or second surface, wherein the polyurethane is configured to reflect and/or absorb sound directed to the dash insulator.

17. The vehicle of claim 16, wherein the polyurethane comprises a layer of polyurethane having a first thickness in a first portion and a second thickness greater than the first thickness in a second portion.

18. A vehicle, comprising:

an engine compartment;

a passenger compartment comprising a floor;

a firewall separating the engine compartment and passenger compartment, wherein the firewall includes one or more openings formed therethrough; and a vehicle cockpit assembly installed within the passenger compartment, wherein the cockpit assembly comprises:

a dash insulator that is configured to be attached in face-to-face contacting relationship to the vehicle firewall, comprising:

a substrate of thermoformable material having opposite first and second surfaces and opposite first and second edge portions; and one or more apertures formed through the substrate, each of which overlies a respective one of the firewall openings, and wherein each aperture is configured to sealably receive an item extending therethrough between the engine and passenger compartments such that no gaps exist between the item and the substrate;

polyurethane applied to one or more portions of the substrate first and/or second surfaces, wherein the polyurethane is configured to reflect and/or absorb sound directed to the dash insulator;

an instrument panel adhesively attached to the substrate first edge portion, wherein the instrument panel and dash insulator can move relative to each other to facilitate installation of the cockpit assembly within the vehicle passenger compartment during vehicle assembly; and a floor covering adhesively attached to the substrate second edge portion, wherein the floor covering and dash insulator can move relative to each other to facilitate installation of the cockpit assembly within the vehicle passenger compartment during vehicle assembly.

19. The vehicle of claim 18, wherein the polyurethane comprises a layer of polyurethane having a first thickness in a first portion and a second thickness greater than the first thickness in a second portion.

20. A vehicle, comprising:

an engine compartment;

a passenger compartment comprising a floor;

a firewall separating the engine compartment and passenger compartment, wherein the firewall includes one or more openings formed therethrough; and a vehicle cockpit assembly installed within the passenger compartment, wherein the cockpit assembly comprises:

a dash insulator that is configured to be attached to the vehicle firewall, comprising:

an upper substrate of thermoformable material having opposite first and second surfaces and opposite first and second edge portions; and a lower substrate of thermoformable material having opposite third and fourth surfaces and opposite third and fourth edge portions;

wherein the upper and lower substrates are configured to be joined together along the respective second and third edge portions;

an instrument panel adhesively attached to the upper substrate first edge portion, wherein the instrument panel and dash insulator can move relative to each other to facilitate installation of the cockpit assembly within the vehicle passenger compartment during vehicle assembly; and a floor covering adhesively attached to the lower substrate fourth edge portion, wherein the floor covering and dash insulator can move relative to each other to facilitate installation of the cockpit assembly within the vehicle passenger compartment during vehicle assembly.

21. The vehicle of claim 20, further comprising polyurethane applied to one or more portions of the dash insulator, wherein the polyurethane is configured to reflect and/or absorb sound directed to the dash insulator.

22. The vehicle of claim 20, wherein the polyurethane comprises a layer of polyurethane having a first thickness in a first portion and a second thickness greater than the first thickness in a second portion.

* * * * *